United States Patent Office 2,926,587
Patented Mar. 1, 1960

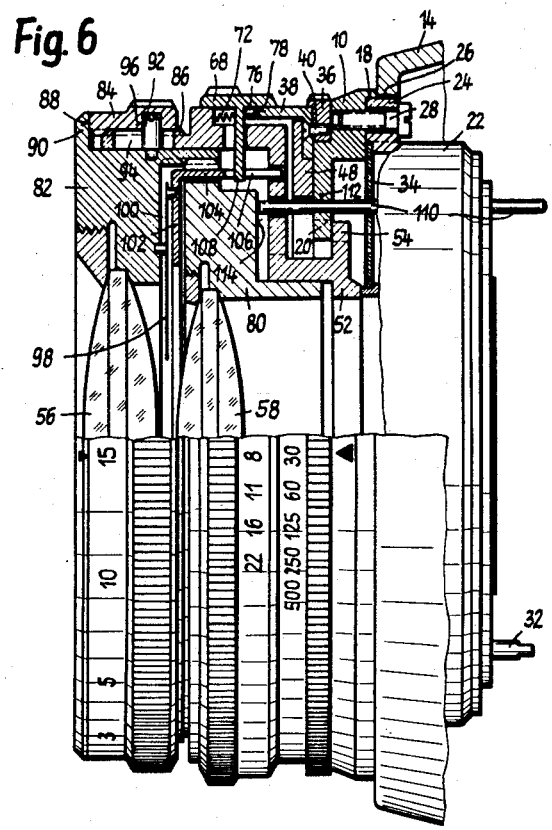

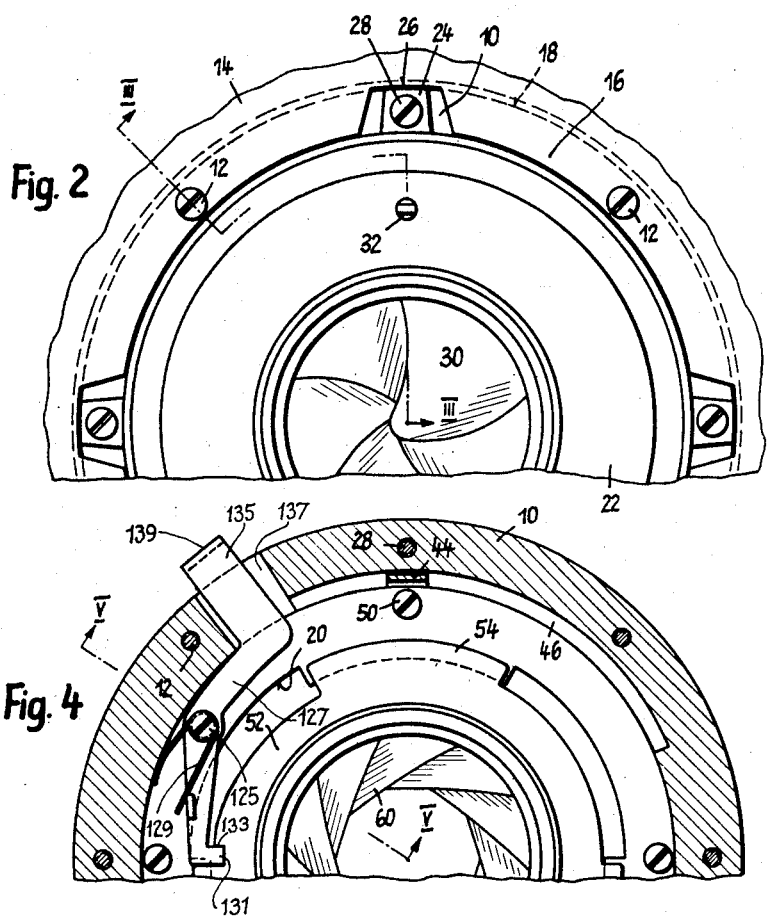

2,926,587

LENS AND SHUTTER MOUNTING MEANS FOR PHOTOGRAPHIC CAMERAS

Kurt Gebele, Munich, Germany, assignor, by mesne assignments, to Compur-Werk Friedrich Deckel OHG., Munich, Germany, a firm of Germany Application October 25, 1955, Serial No. 542,603

Claims priority, application Germany October 29, 1954

4 Claims. (Cl. 95—64)

This invention relates to means for mounting a lens unit and a shutter unit on a photographic camera.

An object of the invention is the provision of generally improved and more satisfactory mounting means of this kind.

Another object is the provision of mounting means useful with interchangeable or replaceable lens units, so designed and constructed that the weight of the lens unit is not transmitted to the camera body through the objective shutter, but is transmitted and supported independently of the objective shutter, so that even if the lens unit is rather heavy (e.g., a telephoto lens) it may be supported with adequate rigidity from the camera body, without requiring strengthening or reinforcement of the shutter casing or housing as would be needed if the shutter casing or housing had to support a heavy lens unit.

Still another object is the provision of mounting means for holding an objective shutter on a photographic camera and also for holding a lens mount of the built-in diaphragm type, with the weight thereof supported independently of the shutter and yet with provision for coupling the diaphragm adjusting means on the lens mount to the shutter speed adjusting means on the shutter.

A further object is the provision of a mount designed for supporting a shutter unit and a lens unit independently of each other regardless of whether the lens unit and/or the shutter unit is removable and repleaceable, or whether it is permanently attached to the camera.

These and other desirable objects may be attained in the manner disclosed as an illustrative embodiment of the invention in the following description and in the accompanying drawings forming a part thereof, in which:

Fig. 1 is a fragmentary radial section, taken substantially along the optical axis of a first embodiment of the present invention, with parts in elevation;

Fig. 2 is a fragmentary rear elevation of the parts shown in Fig. 1, looking in the direction of the arrow A;

Fig. 3 is a view partly in elevation and partly in radial section taken substantially on the line 3—3 of Fig. 2, showing the main mounting means and the shutter unit in place thereon, but with the lens unit removed;

Fig. 4 is a transverse section taken substantially on the line 4—4 of Fig. 1;

Fig. 5 is a fragmentary radial section taken approximately on the line 5—5 of Fig. 4; and Fig. 6 is a view partly in side elevation and partly in radial axial section, showing a construction in accordance with a second embodiment of the present invention.

The same reference numerals throughout the several views indicate the same parts.

Referring now to Figs. 1–5, the camera body itself may be of any conventional kind suitable for use with a shutter of the objective type. The exact details of construction of the camera body are not important for purposes of the present invention. A fragment of the front portion of the camera body is shown at 14.

According to the invention, a mounting ring 10 is fastened on the front of the camera body 14 by means of a plurality of screws 12 at circumferentially spaced intervals. The ring 10 is preferably of circular outline, and is arranged concentric with the optical axis of the camera. A cylindrical projection or flange 16 on the front of the camera 14 mates with and engages in a cylindrical groove or depression 18 on the rear face of the mounting ring 10, and serves, along with the screws 12, to hold the ring 10 firmly mounted in fixed position on the camera body and properly alined with the optical axis.

If the mounting means of the present invention is to be used with a lens unit or lens mount of the detachable and interchangeable kind, the mounting ring 10 preferably constitutes a bayonet mounting ring, provided with bayonet slots 20 to mate with corresponding bayonet lugs on the lens mount or lens unit, which will be described in greater detail below.

The shutter unit comprises a casing or housing 22 of the familiar annular shape customarily used for objective shutters, the periphery of the casing being provided with a circumferentially spaced series of radially projecting lugs or flanges 24 which extend into recesses 26 formed in the front wall of the camera body 14 in the intervals between the holding screws 12, as best seen in Fig. 2. Headed screws 28 extend forwardly in an axial direction through suitable openings in the lugs 24 and are threaded into tapped openings in the ring 10, so as to hold the shutter housing or casing 22 against the rear face of the ring 10, thereby mounting the shutter unit on the mounting ring and holding it in proper optical alinement with the mounting ring. In the shutter housing 22 are the usual shutter blades 30 of any desired number, together with their driving mechanism and control mechanism of known type and manner of operation.

The cocking or tensioning of the shutter to make it ready for an exposure, as well as the release or triggering of the shutter to initiate an exposure, are both accomplished by rotation of the shaft 32 by suitable mechanism within the camera body for turning the shaft first in one direction to tension or cock the shutter, and then in the other direction to release or trigger the shutter. The details of the operating and control mechanism within the shutter itself, as well as the details of the mechanism within the camera body for turning the shaft 32, are not important for purposes of the present invention. Reference may be made, however, to the copending United States patent application of Kurt Gebele, Serial No. 520,875, filed July 8, 1955, now Patent No. 2,900,886, which discloses examples of detailed constructions which are satisfactory for use within the shutter casing and within the camera body, for the purposes mentioned.

The setting of the shutter speed or duration of exposure is effected by turning a rotatable speed adjusting ring 34 which is supported rotatably on the shutter casing at the front thereof and which is operatively connected in the manner now to be described with an externally accessible speed setting ring 36 mounted for rotation on the front of the mounting ring 10 and having a roughened or serrated periphery which projects radially slightly beyond the edge of the mounting ring 10, as seen in Fig. 1, so that it may be readily grasped and turned by the operator's fingers. A cylindrical flange 38 projects forwardly from the speed adjusting ring 36, and either is formed integrally therewith or preferably is formed as a separate ring of L-shaped radial cross section secured to the front of the ring 36 by means of screws 40, so that the members 36 and 38 turn together as a unit. A supplementary stationary ring 48 is held in fixed position on the main mounting ring 10 by means of a plurality of screws 50, and has a radial flange which overlies the front face of the radial flange of the member 38, to hold the joined members 36 and 38 in proper position on the ring 10 and prevent axial forward movement of these members.

The previously mentioned speed adjusting ring 34 of the shutter is provided with a forwardly projecting ear or tongue 44 which extends forwardly through an arcuate slot 46 (Figs. 1 and 4) in the ring 10, and enters a notch or opening 42 in the external driving members 36, 38 so that when the members 36, 38 are turned, the rotary movement (about the optical axis as a center of rotation) will be transmitted to the internal speed adjusting member 34, to adjust the speed of operation of the shutter or duration of the exposure.

It will be noted from the parts thus far described that the shutter unit is mounted on the rear face of the mounting ring 10 in what may be called a permanent manner, in the sense that it is not intended to be removed and replaced in normal operation, but the shutter may be removed for necessary repairs or adjustment, by opening up the back of the camera to obtain access to the screws 28 which may be removed to permit the entire shutter unit to be moved axially rearwardly and out the back door or closure of the camera. It is to be noted that when the shutter is removed or replaced, it is not necessary to disassemble the speed adjusting members 36, 38 from their normal position on the front of the main mounting ring 10. The forwardly projecting tongue 44 on the shutter speed adjusting ring 34 simply withdraws rearwardly from its notch or opening 42 in the members 36, 38 when the shutter is removed from the camera body, and is pushed forwardly into this notch 42 when the shutter is replaced in the camera body after the necessary repairs or adjustment.

The same main mounting ring 10 serves not only to support the shutter in the manner already described, but also to support the lens unit or lens mount, preferably in a detachable and replaceable manner, although the lens unit may be permanently mounted on the front of the ring 10 by means of screws, if desired. In the preferred form of detachable mounting, the main part 52 of the lens unit is provided with bayonet lugs extending radially outwardly near the rear of the lens unit, as seen at 54, which mate in the usual manner with the bayonet notches and lugs of the mounting ring 10. Thus if the lens mount is alined axially with the shutter, and is oriented to bring the bayonet lugs 54 of the mount opposite the bayonet notches 20 of the mounting ring, the lens mount may then be moved axially rearwardly toward the shutter, until the bayonet lugs 54 pass through the notches 20, whereupon the lens mount may be turned about its optical axis as a center, to engage the lugs 54 behind the solid or unnotched part of the ring 10.

To prevent accidental rotation of the lens unit in a reverse direction after it is mounted on the camera, which might result in disconnecting the bayonet lugs and allowing the lens unit to drop accidentally off of the camera, there is preferably a latch of the kind best shown in Figs. 4 and 5. On a screw 125 threaded into the mounting ring 10 and the stationary supplementary ring 48, there is pivoted a latch member 127 urged by a hairpin spring 129 to turn in a counterclockwise direction on its pivot 125, when viewed from the rear as in Fig. 4. This latch member 127 has a tail 131 which engages in a notch 133 on the lens mount or lens unit 52, to prevent rotation of the latter whenever the parts 131, 133 are engaged with each other. The latch also has, at its end opposite to the nose 131, an operating portion 135 extending radially outwardly through a slot 137 in the ring 10, and having a bent over end 139 constituting a finger piece which may be pressed radially inwardly in order to move the nose 131 radially outwardly from the notch 133, to permit rotation of the lens unit in order to disconnect the bayonet connection when it is desired to replace the unit with a different lens mount.

The lens unit or mount includes any desired number of lens components, such as the lenses 56 and 58 indicated diagrammatically in Fig. 1. It also includes preferably an adjustable iris diaphragm including a series of pivoted leaves or blades 60 adjusted in known manner by rotation of an aperture adjusting ring 62 which is rotatable within the lens unit 52 about the optical axis as a center. The ring 62 lies mostly within the lens mount, but has a radial arm 64 which extends outward through a slot 66 in the mount and is received in an axial groove or slot 74 of an external ring 68 rotatable on the periphery of the lens mount structure 52, on the cylindrical portion 70 thereof. This ring 68 is also mounted for limited axial movement with respect to the lens mount structure 52, and is normally urged axially in a rearward direction by a plurality of light springs 72 arranged at intervals around the periphery. The ring has a circumferentially extending raised rib or projection which is serrated or roughened for easy grasping and turning by the operator's fingers.

Because of the engagement of the arm 64 of the ring 62 in the slot 74 of the ring 68, the two rings are constantly coupled together so that rotation of the externally accessible ring 68 will serve to turn the internal ring 62 to adjust the size of the diaphragm aperture. But the ring 68 serves not only as an aperture adjusting ring, but also as a coupling ring for coupling the aperture adjustment to the shutter speed adjustment. For this purpose, the ring 68 has a tooth 76 projecting radially rearwardly, and adapted to engage in any selected one of a series of notches 78 formed in the front edge of the member 38 which, it will be remembered, is coupled to the speed adjusting ring 34 of the shutter unit. In this way, any rotation of the ring 68 serves to adjust both the diaphragm aperture and the shutter speed, the parts being so designed as to shape and size that the adjustment is made in a complementary manner, increasing the length of the exposure by the proper amount to compensate for a decrease in the diaphragm aperture, or vice versa, as the case may be. If it is desired to change the orientation of the ring 68 with respect to the members 36, 38 so as to make allowance for an increase or decrease in the illumination of the subject to be photographed or for a different film speed, etc., this is easily done by moving the ring 68 axially forwardly against the force of the light springs 72, so as to move the tooth 76 out of the notch 78 in which it was seated. Then the ring 68 is turned while holding it forwardly, so that it does not cause any turning of the ring 38, and when the desired orientation of the two rings have been achieved, the ring 68 is moved rearwardly again to seat the tooth 76 in the appropriate one of the notches 78.

With the construction as described above, it is seen that the lens unit or lens mount is placed on the front of the main mounting ring 10, while the shutter unit is placed on the rear of such mounting ring. The weight of the lens unit is not transmitted to the camera body through the shutter, but is supported from the mounting ring 10. Even though the lens unit may make contact with the shutter at certain times or in certain positions, it is not supported primarily by the shutter. Therefore, a shutter casing of ordinary size and strength may be used, even when it is desired to use the camera with extra long and extra heavy telephoto lenses or other large and weighty lenses, and it is not necessary to strengthen or reinforce the shutter casing in order to support the extra weight of the large lenses, as would be the case if the interchangeable lenses were carried in the conventional manner by the shutter casing, rather than by the separate mounting ring 10. The lens unit may easily be taken off the camera for replacement by a different lens unit, by depressing the finger piece 139 of the latch and turning the lens unit to disengage the bayonet connection. When the lens unit is moved forwardly away from the camera, the tooth 76 of the ring 68 simply moves forwardly out of the notch 78 in which it was seated, without causing any difficulty.

The second embodiment of the present invention, shown in Fig. 6, is essentially the same as the first embodiment in most of its features, and such features are designated in Fig. 6 by the same reference numerals previously used in Figs. 1–5, so that no further description of these common parts is needed. The principal difference is that in this second embodiment, the lenses are not in fixed position in the housing, but are capable of axial movement for focusing purposes.

To this end, the main body 52 of the lens unit is provided with tubular parts 80 and 82 screwed or otherwise suitably connected to each other to move as a unit in an axial direction in the main body 52. The lens 56 is carried in the part 82, and the lens 58 is carried in the part 80, as shown. Both parts together are displaced axially for focusing, by means of a focusing ring 84 mounted for rotation on the periphery of the body 52 and internally threaded to mate with external threads on the body so that the ring 84 will move axially forwardly or rearwardly as it is rotated, the threads being indicated at 86. The front edge 88 of the ring 84 bears against a flange 90 of the part 82. The axial component of the helical motion of the focusing ring 84 is transferred to the part 80, 82 by means of a radial pin 92 seated in the part 82, extending radially outwardly through an axial slot 94 in the body 52 and engaging in an annular or circumferential groove 96 in the threaded ring 84.

The adjustable iris diaphragm, comprising a series of diaphragm leaves 98, is arranged in the cavity 100 between the parts 80 and 82. The setting ring 102 for adjusting the diaphragm leaves has an angularly bent and axially extending arm 104 extending through a circumferential slot in the part 80, and provided with an axially extending slot 106 which receives the inner end of a radially projecting arm 108 extending inwardly from the coupling ring 68 which serves the same function as the ring 68 in the previous embodiment and which likewise is movable axially and is pressed rearwardly by springs 72 and is coupled by means of a tooth 76 engaging in any selected one of a series of notches 78 in the front edge of the shutter speed setting member 38. The slot 106 in the member 104 is somewhat longer than the axial range of focusing displacement of the lens tubes 80 and 82, to allow not only for such axial focusing displacement but also for the axial displacement of the ring 68 when uncoupling it from and coupling it to the ring 38, in case such coupling and uncoupling movement occurs at either end of the maximum range of movement of the focusing parts.

If desired, the focusing parts of the lens units may be appropriately coupled to a range finder or distance meter of any known kind, mounted on the camera body. This is accomplished by the transfer pin 110 which extends axially (that is, parallel to the optical axis) through a bore 112 in the mounting ring 10 and through appropriate holes or slots in the other parts, and is urged forwardly by a light spring so that the front end of the pin 110 bears against a radial surface 114 on the displaceable focusing part 80. The rear end of the pin projects into the camera body, as shown, where it is connected in any suitable manner to the range finder or other distance measuring device of known construction.

Certain aspects of the present construction constitute a further development and improvement upon the construction disclosed in the copending United States patent application of Kurt Gebele, Serial No. 509,928, filed May 20, 1955, which is a continuation in part of application Serial No. 193,722, filed November 2, 1950. Said applications 193,722 and 509,928 are now abandoned.

Although the present construction, in both its embodiments, utilizes a lens unit having a built-in adjustable diaphragm, it is evident that various aspects of the invention are independent of such diaphragm and may be used with a lens unit or lens mount which does not have a built-in diaphragm. Also, various aspects of the invention may be used, as already intimated, with lens mounts which are permanently attached to the camera, instead of being removable and interchangeable. Likewise the objective shutter may be removably and interchangeably attached to the mounting ring.

It is seen from the foregoing disclosure that the above mentioned objects of the invention are well fulfilled. It is to be understood that the foregoing disclosure is given by way of illustrative example only, rather than by way of limitation, and that without departing from the invention, the detail may be varied within the scope of the appended claims.

What is claimed is:

1. The combination with a camera body part, of a mounting ring secured to said body part near the front thereof, said mounting ring having a plurality of bayonet lugs thereon, an objective shutter lying at least mainly on the rear of said ring, said shutter having a plurality of radially extending lugs overlapping and lying against said ring, a plurality of screws circumferentially spaced around said ring and extending through said lugs and threaded into said ring to secure said shutter in fixed position on said ring, said shutter including a shutter speed adjusting member, a speed adjusting ring rotatably mounted on and supported from said mounting ring and externally accessible for manual rotation, means coupling said speed adjusting member of said shutter to said speed adjusting ring to move the former from movement of the latter, a lens unit located on the front of said mounting ring, cooperating bayonet connection parts on said lens unit and said mounting ring for detachably securing said unit to said mounting ring, said lens unit including an adjustable diaphragm, a diaphragm adjusting ring rotatably mounted on said lens unit, and separable coupling means for coupling said diaphragm adjusting ring to said speed adjusting ring to turn together when said lens unit is secured in normal operative position on said mounting ring.

2. A construction as defined in claim 1, in which said diaphragm adjusting ring is movable axially on said lens unit, and in which said means for coupling said diaphragm adjusting ring to said speed adjusting ring includes a tooth on one of said rings and a series of notches on the other of said rings, in any one of which notches said tooth may be selectively seated upon moving said diaphragm adjusting ring axially to disengage said tooth from the notch in which it was previously seated.

3. A construction as defined in claim 1, further including a locking pawl pivotally mounted within said mounting ring and having a portion engaging said lens unit to hold said unit against movement in a direction to release said bayonet connection parts, a substantially radial slot in said mounting ring, and an operating part on said locking pawl extending through said slot to an external accessible position for manual actuation to shift said pawl to a non-obstructing position with respect to said lens unit so that said unit may be moved in a direction to release said bayonet connection parts for removal of said lens unit from said mounting ring.

4. The combination with a camera body part, of a mounting ring secured to said body part near the front thereof, an objective shutter lying at least mainly on the rear of said ring, means securing said shutter in fixed position on said ring to support the weight of said shutter substantially entirely from said mounting ring, said shutter including a shutter speed adjusting member, a speed adjusting ring rotatably mounted on and supported from said mounting ring and externally accessible for manual rotation, means coupling said speed adjusting member of said shutter to said speed adjusting ring to move the former from movement of the latter, a lens unit mounted on the front of said mounting ring, cooperating detachable bayonet connection parts on said lens unit and said mounting ring for detachably securing said unit to said mounting ring, said lens unit including an adjustable diaphragm, a diaphragm adjusting ring rotatably mounted on said lens unit, and separable coupling means for coupling said diaphragm adjusting ring to said speed adjusting ring to turn together when said lens unit is secured in normal operative position on said mounting ring.

References Cited in the file of this patent

UNITED STATES PATENTS

| | | |
|---|---|---|
| 2,136,149 | Nuchterlein | Nov. 8, 1938 |
| 2,190,729 | Nerwin | Feb. 20, 1940 |
| 2,260,991 | Gorey | Oct. 28, 1941 |
| 2,716,930 | Marson | Sept. 6, 1955 |

FOREIGN PATENTS

| | | |
|---|---|---|
| 303,088 | Germany | Jan. 18, 1918 |
| 676,075 | Great Britain | July 23, 1952 |
| 288,180 | Switzerland | May 1, 1953 |
| 1,090,214 | France | Oct. 13, 1954 |